United States Patent [19]

Newing

[11] 4,069,933
[45] Jan. 24, 1978

[54] POLYETHYLENE TEREPHTHALATE BOTTLE FOR CARBONATED BEVERAGES HAVING REDUCED BUBBLE NUCLEATION

[75] Inventor: Charles Wesley Newing, Toledo, Ohio

[73] Assignee: Owens-Illinois, Inc., Toledo, Ohio

[21] Appl. No.: 726,376

[22] Filed: Sept. 24, 1976

[51] Int. Cl.² .......................................... B65D 25/14
[52] U.S. Cl. .......................... 215/1 C; 215/DIG. 6; 220/64; 264/129; 264/211; 426/106; 426/398; 427/230; 427/140; 428/35
[58] Field of Search ............ 426/106, 131, 398, 127; 215/1 C, DIG. 6, 12 R; 220/64; 428/35; 427/230–233, 235, 236, 140

[56] References Cited

U.S. PATENT DOCUMENTS

| | | | |
|---|---|---|---|
| 2,787,552 | 4/1957 | Seiferth | 426/106 X |
| 3,733,309 | 5/1973 | Wyeth et al. | 215/1 C X |
| 3,745,150 | 7/1973 | Corsover | 215/1 C X |
| 3,765,907 | 10/1973 | Killoran et al. | 426/410 |

Primary Examiner—Steven L. Weinstein
Attorney, Agent, or Firm—Richard D. Heberling

[57] ABSTRACT

There is provided a polyethylene terephthalate bottle for liquid-carbonated beverages, the bottle having an interior liquid-contacting surface containing an effective wetting amount of oleic acid to cover any microflaws present and to thereby reduce bubble nucleation and carbonation loss. There is also provided a method of reducing bubble nucleation and carbonation loss in a polyethylene terephthalate bottle by providing, preferably by coating, the interior beverage contacting surface of the bottle with an effective wetting amount of oleic acid.

4 Claims, 2 Drawing Figures

POLYETHYLENE TEREPHTHALATE BOTTLE FOR CARBONATED BEVERAGES HAVING REDUCED BUBBLE NUCLEATION

INVENTION

The present invention relates to a polyethylene terephthalate bottle for carbonated beverages, the bottle having an interior liquid-contacting surface containing an effective wetting amount of oleic acid, to thereby reduce carbon dioxide bubble nucleation and carbonation loss.

In the past, polyethylene terephthalate bottles, particularly those which have been biaxially oriented in accordance with, for example, U.S. Pat. No. 3,733,309, have had a drawback, there being microflaws in the interior surface, such as fissures or checks, which tends to lead to bubble nucleation and carbonation loss. The appearance of bubbles in the carbonated beverage inside the bottle is not desirable, and the carbonation loss of the liquid beverage in the container is likewise not desirable.

It is an object of the present invention to provide a polyethylene terephthalate bottle for liquid-carbonated beverages having an interior liquid-containing surface that contains an effective wetting amount of oleic acid to cover microflaws and thereby reduce the carbon dioxide bubble nucleation and any carbonation loss.

It is an object of the present invention to provide a method of reducing bubble nucleation and carbonation loss in a polyethylene terephthalate bottle containing a carbonated beverage, the method comprising the step of coating the interior beverage contacting surface of the bottle with an effective wetting amount of oleic acid to cover microflaws and to reduce bubble nucleation, and thereafter filling the bottle with a carbonated beverage under pressure.

These and other objects will be apparent from the specification that follows, the appended claims and the drawings, in which:

Figures 1, 2:
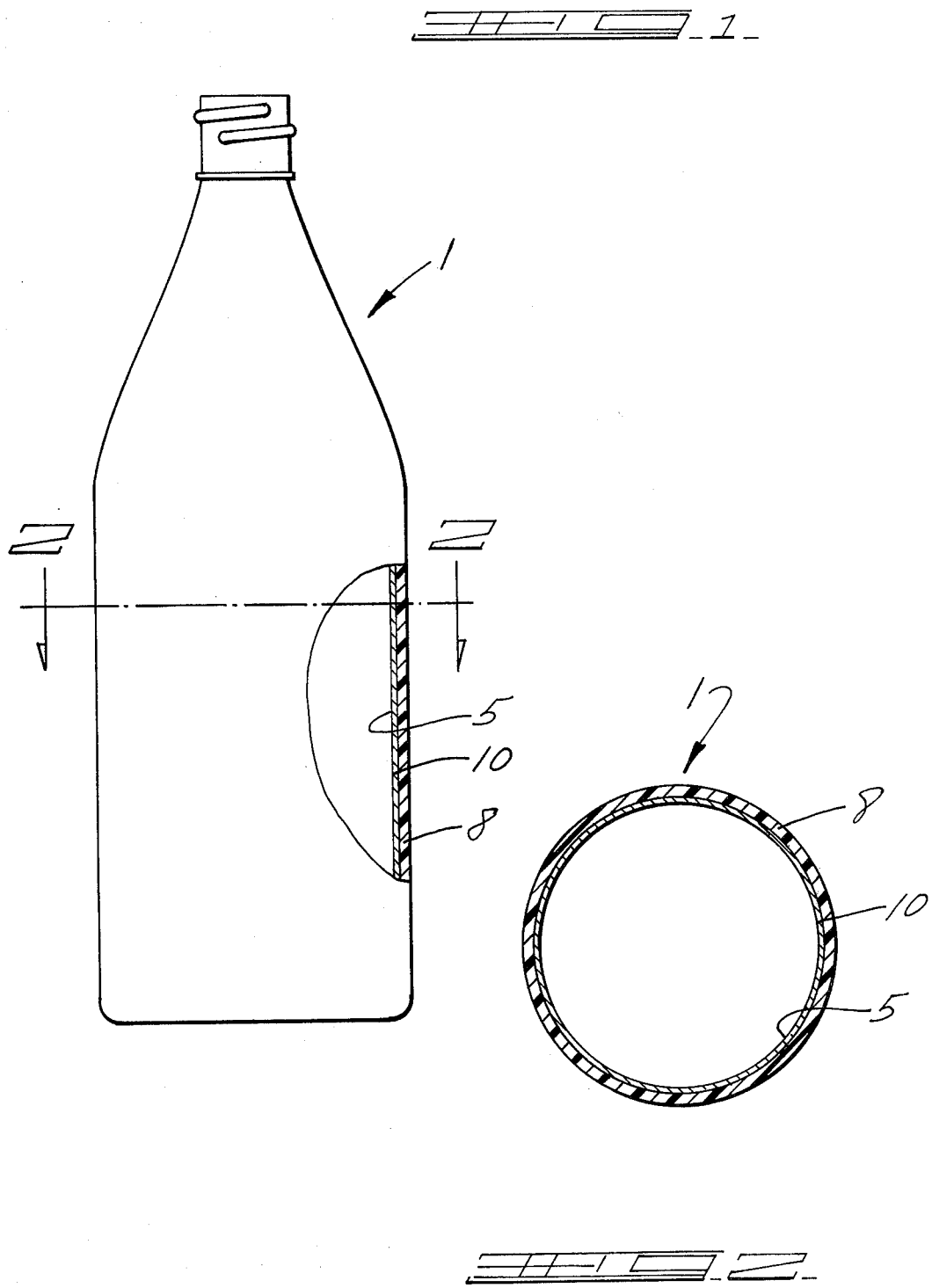
FIG. 1 is a side elevational view of a polyethylene terephthalate bottle.
FIG. 2 is a sectional view of the bottle of FIG. 1 showing the interior beverage contacting surface of the bottle with a wetting amount of oleic acid in accordance with the present invention.

The present invention provides a polyethylene terphthalate bottle 1 for liquid-carbonated beverages having an interior liquid-contacting surface 5 on the bottle sidewall 8. The interior liquid-contacting surface 5 has an effective wetting amount 10 of oleic acid to cover any microflaws (such as fissures and checks) present, to thereby reduce bubble nucleation and carbonation loss.

In a preferred embodiment of the present invention, the interior liquid contacting surface is coated with an effective wetting amount of oleic acid to reduce bubble nucleation and carbonation loss.

The present invention also provides a method of reducing bubble nucleations and carbonation loss in a polyethylene terephthalate bottle contacting a carbonated beverage, the method comprising the step of providing the interior beverage-contacting surface 5 of the bottle 1 with an effective wetting amount of oleic acid 10 to cover microflaws and to reduce bubble nucleation.

In a preferred method, in accordance with the present invention, the interior beverage-contacting surface of the bottle is coated with an effective wetting amount of oleic acid.

The method of the present invention reduces bubble nucleation from the interior surface of the polyethylene terephthalate carbonated beverage bottle and allows the use of the bottle having microflaws or having a surface which is not extremely free of otherwise harmless organic contaminants, and yet provides an outstanding package having low carbonation loss, even when the container is opened and closed.

The method of the present invention changes the morphology of the liquid-contacting surface of the polyethylene terephthalate bottle, which is then filled with the carbonated beverage and the resultant beverage stored with a reduction of or elimination of bubble nucleation to overcome one of the drawbacks to the use of polyethylene terephthalate bottles for carbonated beverages.

A polyethylene terephthalate bottle was coated on the inside with oleic acid and observed thereafter, the beverage being stored at a carbonation pressure of about 70 psi. No bubbling was observed, indicating that the oleic acid had wet properly the interior surface of the beverage-contacting surface of the bottle. The oleic acid is easily applied in liquid form in room temperature and has very little or no solubility in carbonated beverages. The oleic acid film or coating has a surface tension of less than 42 per centimeter, and it is FDA approved for contact with food or as a food additive.

The oleic acid can be added to the polyethylene terphthalate resin during the preparation thereof or before or during the blow molding of the bottle, for instance, by including the oleic acid in the blow air. Likewise, oleic acid can be added before or during parison formulation or, in a preferred embodiment, applied as a surface treatment following the blow molding of the bottle. It can also be applied in a bottle wash or rinse cycle after the formulation of the bottle, to provide an outstanding carbonated beverage bottle.

What is claimed is:

1. A polyethylene terephthalate bottle for liquid carbonated beverages having an interior liquid-contacting surface containing an effective wetting amount of oleic acid to reduce carbon dioxide bubble nucleation and carbonation loss.

2. A polyethylene terephthalate bottle for liquid carbonated beverages having an interior liquid-contacting surface coated with an effective wetting amount of oleic acid to cover microflaws and thereby reduce carbon dioxide bubble nucleation and carbonation loss.

3. A method of reducing bubble nucleation and carbonation loss in a polyethylene terephthalate plastic bottle containing a carbonated beverage, the method comprising the steps of providing the interior beverage-contacting surface of the bottle with an effective wetting amount of oleic acid to reduce bubble nucleation.

4. A method of reducing bubble nucleation and carbonation loss in a polyethylene terephthalate plastic bottle containing a carbonated beverage, the method comprising the step of coating the interior beverage-contacting surface of the bottle with an effective wetting amount of oleic acid to cover microflaws and to reduce bubble nucleation.

* * * * *